United States Patent
Desbiens (10) Patent No.: US 7,333,995 B2
(45) Date of Patent: Feb. 19, 2008

(54) VERY LARGE DATASET REPRESENTATION SYSTEM AND METHOD

(75) Inventor: Marc A. Desbiens, Ottawa (CA)

(73) Assignee: Cognos, Incorporated, Ottawa, Ontario (CA)

( * ) Notice: Subject to any disclaimer, the term of this patent is extended or adjusted under 35 U.S.C. 154(b) by 473 days.

(21) Appl. No.: 10/884,808

(22) Filed: Jul. 2, 2004

(65) Prior Publication Data

US 2006/0004813 A1    Jan. 5, 2006

(51) Int. Cl.
*G06F 7/00* (2006.01)
*G06F 9/44* (2006.01)

(52) U.S. Cl. .............................. 707/100; 707/1; 707/6; 707/200; 717/120; 705/7

(58) Field of Classification Search ..... 707/100–104.1, 707/1, 4, 10, 200; 705/7; 717/120
See application file for complete search history.

(56) References Cited

U.S. PATENT DOCUMENTS

| | | | |
|---|---|---|---|
| 5,579,444 A * | 11/1996 | Dalziel et al. | 700/259 |
| 5,758,355 A | 5/1998 | Buchanan | |
| 5,794,246 A * | 8/1998 | Sankaran et al. | 707/101 |
| 5,870,746 A | 2/1999 | Knutson et al. | |
| 5,937,155 A | 8/1999 | Kennedy et al. | |
| 6,067,548 A * | 5/2000 | Cheng | 707/103 R |
| 6,160,549 A | 12/2000 | Touma et al. | |
| 6,275,818 B1 * | 8/2001 | Subramanian et al. | 707/2 |
| 6,341,286 B1 | 1/2002 | Kawano | |
| 6,349,275 B1 | 2/2002 | Schumacher et al. | |
| 6,408,292 B1 * | 6/2002 | Bakalash et al. | 707/2 |
| 6,430,584 B1 | 8/2002 | Comer et al. | |
| 6,457,008 B1 * | 9/2002 | Rhee et al. | 707/10 |
| 6,460,031 B1 | 10/2002 | Wilson, III et al. | |
| 6,567,814 B1 * | 5/2003 | Bankier et al. | 707/101 |
| 6,581,068 B1 | 6/2003 | Bensoussan et al. | |
| 6,697,999 B1 | 2/2004 | Breuer et al. | |

(Continued)

FOREIGN PATENT DOCUMENTS

CA    2361176    5/2003

(Continued)

OTHER PUBLICATIONS

Bott, Ed, "Using Microsoft Office 2000," Que Corporation, 1999, 34 pages.

*Primary Examiner*—Shahid Alam
*Assistant Examiner*—Anh Ly
(74) *Attorney, Agent, or Firm*—Shumaker & Sieffert, P.A.

(57) ABSTRACT

A system and method for representing a very large dataset that enables a plan manager to define, based upon an organization modelling object, a delegation modelling object for a very large dataset. A very large dataset delegation of multiple subplans is created whose subplans can then be individually filtered for specific size restrictions. This enables a plan manager to filter the definition of each subplan prior to the execution of the delegation modelling object, precluding any need for higher-level subplans to contain all the data contained in their subordinate subplans. This allows subplans to contain increased levels of detail not included in their superior subplans, detail that will instead only be summarized in higher-level subplans. A subsequent consolidation process will then extract data not found at higher levels from each delegated subplan, and return that data to its original dataset.

13 Claims, 8 Drawing Sheets

U.S. PATENT DOCUMENTS

| | | |
|---|---|---|
| 6,768,994 B1 | 7/2004 | Howard et al. |
| 6,871,319 B2 | 3/2005 | Taboada et al. |
| 6,892,348 B1 | 5/2005 | Truelove et al. |
| 7,007,029 B1* | 2/2006 | Chen .......................... 707/100 |
| 7,139,686 B1 | 11/2006 | Critz et al. |
| 7,140,001 B1 | 11/2006 | Natori et al. |
| 7,207,005 B2 | 4/2007 | Lakritz |
| 2002/0069230 A1 | 6/2002 | Schubert, Jr. et al. |
| 2002/0073080 A1* | 6/2002 | Lipkin ............................ 707/3 |
| 2002/0143831 A1 | 10/2002 | Bennett |
| 2002/0188896 A1 | 12/2002 | Filteau et al. |
| 2003/0084053 A1* | 5/2003 | Govrin et al. ............... 707/100 |
| 2003/0088447 A1 | 5/2003 | Desbiens et al. |
| 2003/0088540 A1* | 5/2003 | Edmunds et al. ............... 707/1 |
| 2003/0088565 A1* | 5/2003 | Walter et al. ................... 707/6 |
| 2003/0140316 A1 | 7/2003 | Lakritz |
| 2003/0144922 A1 | 7/2003 | Schrantz |
| 2003/0172059 A1* | 9/2003 | Andrei ............................ 707/3 |
| 2003/0172168 A1 | 9/2003 | Mak et al. |
| 2003/0217063 A1* | 11/2003 | Tomic et al. ............... 707/100 |
| 2004/0060001 A1 | 3/2004 | Coffen et al. |
| 2004/0088650 A1 | 5/2004 | Killen et al. |
| 2004/0122845 A1* | 6/2004 | Lohman et al. ............. 707/102 |
| 2004/0139102 A1* | 7/2004 | Vierich et al. .............. 707/102 |
| 2004/0139426 A1* | 7/2004 | Wu .............................. 717/120 |
| 2004/0148278 A1* | 7/2004 | Milo et al. ...................... 707/3 |
| 2004/0221233 A1 | 11/2004 | Thielen |
| 2004/0236738 A1* | 11/2004 | Thier et al. ...................... 707/4 |
| 2004/0243593 A1* | 12/2004 | Stolte et al. ................ 707/100 |
| 2005/0010550 A1* | 1/2005 | Potter et al. ..................... 707/1 |
| 2005/0033600 A1* | 2/2005 | Geddes et al. .................. 705/1 |
| 2005/0131924 A1* | 6/2005 | Jones ......................... 707/100 |
| 2005/0177532 A1* | 8/2005 | Desbiens ........................ 707/1 |
| 2005/0228815 A1 | 10/2005 | Carus et al. |
| 2006/0200448 A1* | 9/2006 | Edmunds et al. ............... 707/2 |
| 2006/0259509 A1* | 11/2006 | Stolte et al. ................ 707/102 |

FOREIGN PATENT DOCUMENTS

| | | |
|---|---|---|
| WO | 00/42553 | 7/2000 |

\* cited by examiner

VERY LARGE DATASET REPRESENTATION SYSTEM AND METHOD

FIELD OF THE INVENTION

The present invention relates generally to electronic databases, and more particularly to the dimensional modelling of a very large dataset.

BACKGROUND OF THE INVENTION

With advances in contemporary business information systems, all levels of an organization can now enjoy access to repositories of business data known as data warehouses. Data warehousing techniques enable businesses to eliminate extensive amounts of unnecessary workload generated by multiple redundant reporting tasks, and can further facilitate the standardization of data throughout an organization. Business planning applications such as budgeting and forecasting systems are increasingly being integrated into advanced data warehousing solutions in order to maximize returns on what has often been considerable investments in both computing facilities and the gatherings of data they contain.

A data warehouse contains collections of related data known as datasets. When these datasets are relatively small, such as when a data warehouse has been recently implemented, users can easily access and work with complete datasets directly on their personal computer systems. However, difficulties arise when datasets get larger. Datasets can eventually grow within a data warehouse facility to contain billions upon billions of individual data values, many times larger than can be handled by the computational capacity of any single user's computer system.

In order to provide a workable solution for handling these very large datasets, prior art methods have been employed to extract and deliver subsets of these larger datasets to designated users. This has required close management of the size of each data subset to ensure that users receiving these data subsets can consistently access them given the computational limitations of their individual computer systems, limitations such as calculation size limits, fixed memory limitations, and other hard limits. Upon completion of user interaction in these prior art methods, all data subsets must be returned to their "superior" datasets within the data warehouse through a process known as consolidation.

The problem with these prior art methods has been that they employ manual techniques or scripts that must be manually run and maintained in order to extract the data subsets. The consolidation process has also been a mostly manual process of running database-specific scripts. In addition, the administrator responsible for creating and executing the extraction scripts must also keep track of what data has been delivered to which user.

The result has been that prior art data warehouse extraction and consolidation methods are highly time-consuming to define, execute and maintain for very large datasets. Furthermore, the delivery of data subsets to designated users lacks integrated tracking, and is often independent of, and therefore outside the control of the organizational security structure employed by the querying application. Therefore, what is needed is a more manageable data model for supporting very large datasets.

For the foregoing reasons, there is a need for an improved modelling system and method for handling data queries that generate very large datasets.

SUMMARY OF THE INVENTION

The present invention is directed to a very large dataset representation system and method. The system includes a delegation modelling object and a subplan manager for filtering data from subplan definitions in accordance with a predetermined data size limitation in advance of executing the delegation modelling object. The delegation modelling object includes a master dataset definition, one or more than one data dimension-to-user mapping, a target organization definition defining relationships between the master dataset definition and the data dimension-to-user mappings, and a subplan definition derived from each data dimension-to-user mapping.

In an aspect of the present invention, the system further includes an organizational hierarchy description of the data dimension-to-user mappings provided by an organization modelling object having one or more than one data dimension reference, one or more than one user identifier defining intended recipients, and a mapping between each data dimension reference and one or more than one user identifier.

In an aspect of the present invention, the system further includes a consolidator for, upon completion of user interaction, extracting data from each delegated subplan not found in its superior subplans and returning that extracted data to its original dataset.

The method includes the steps of constructing a delegation modelling object, filtering data from subplan definitions in accordance with a predetermined data size limitation in advance of executing the delegation modelling object, and executing the delegation modelling object to extract and generate subplans.

The delegation modelling object is constructed by defining a master dataset, mapping each data dimension to one or more than one user identifier, defining relationships between the master dataset and the data dimension-to-user mappings, and deriving a subplan definition from each data dimension-to-user mapping.

In an aspect of the present invention, the method further includes the step of describing an organization hierarchy of the data dimension-to-user mappings by constructing an organization modelling object through referencing one or more than one data dimension, defining intended recipients with one or more than one user identifier, and mapping each data dimension reference to one or more than one user identifier.

In an aspect of the present invention, the method further includes the step of consolidating data from the delegated subplans upon completion of user interaction by extracting data from each delegated subplan not found in its superior subplans, and returning the extracted data to its original dataset.

The system provides the ability to delegate from data sources directly, and to directly create data source plans, thereby providing a manageable solution for queries that generate very large datasets, datasets that have heretofore proved difficult to manage. The system further enables a plan manager to update and maintain a data warehouse application in a consistent manner.

By providing a highly scalable system of subplans, each within the computational limits of existing computer systems but that are in combination capable of representing a planning problem of virtually any size, the system enables the smooth extraction, management, and consolidation of very large datasets.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

Figure 1:
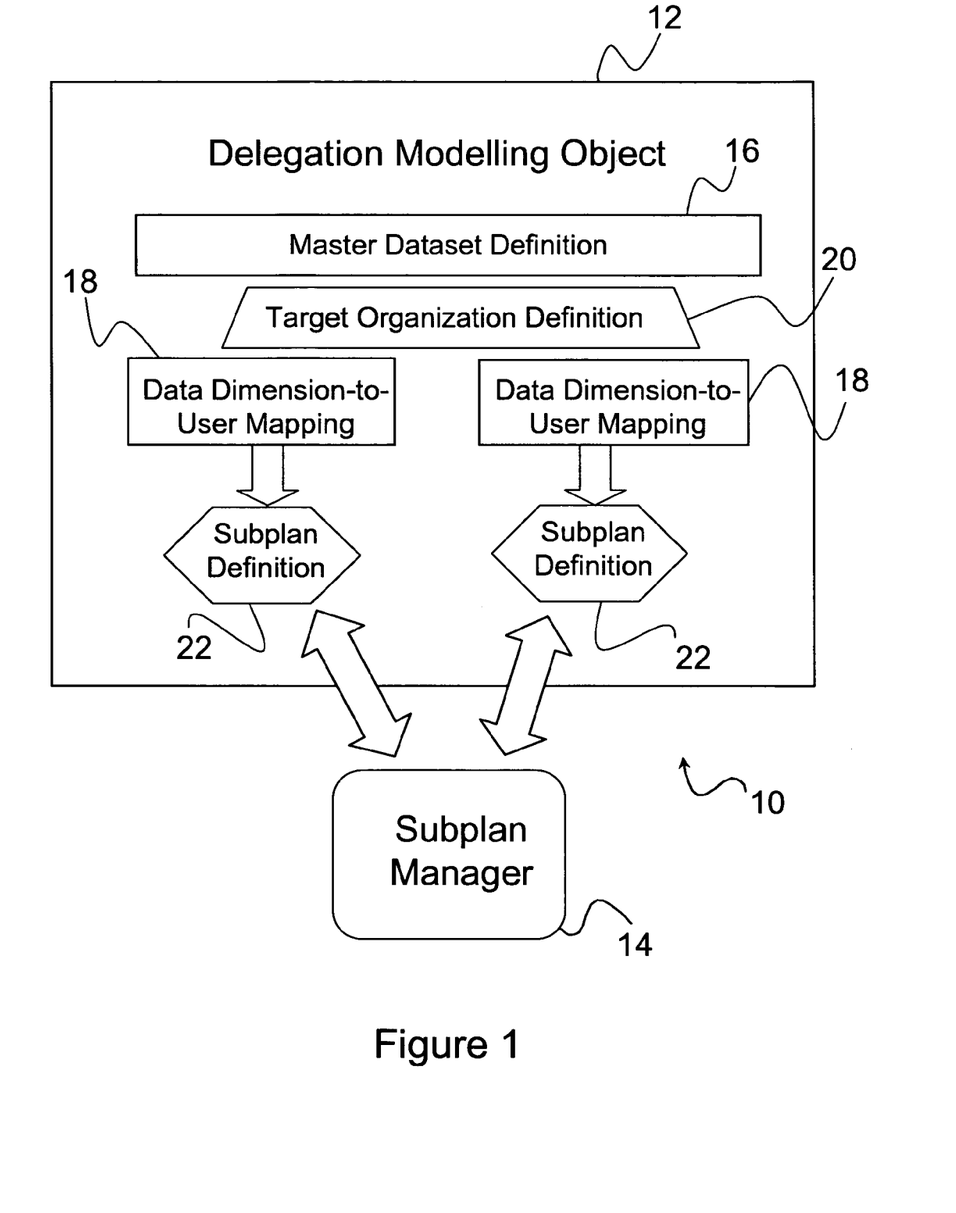
FIG. 1 is an overview of a very large dataset representation system in accordance with an embodiment of the present invention.

Embodiments of the present invention are directed to a very large dataset representation system 10 and method 100. As illustrated in FIG. 1, the system 10 includes a delegation modelling object 12 and a subplan manager 14 for filtering data from subplan definitions 22 in accordance with a predetermined data size limitation in advance of executing the delegation modelling object 12. The delegation modelling object 12 includes a master dataset definition 16, one or more than one data dimension-to-user mapping 18, a target organization definition 20 defining relationships between the master dataset definition 16 and the data dimension-to-user mappings 18, and a subplan definition 22 derived from each data dimension-to-user mapping 18.

Figure 2:
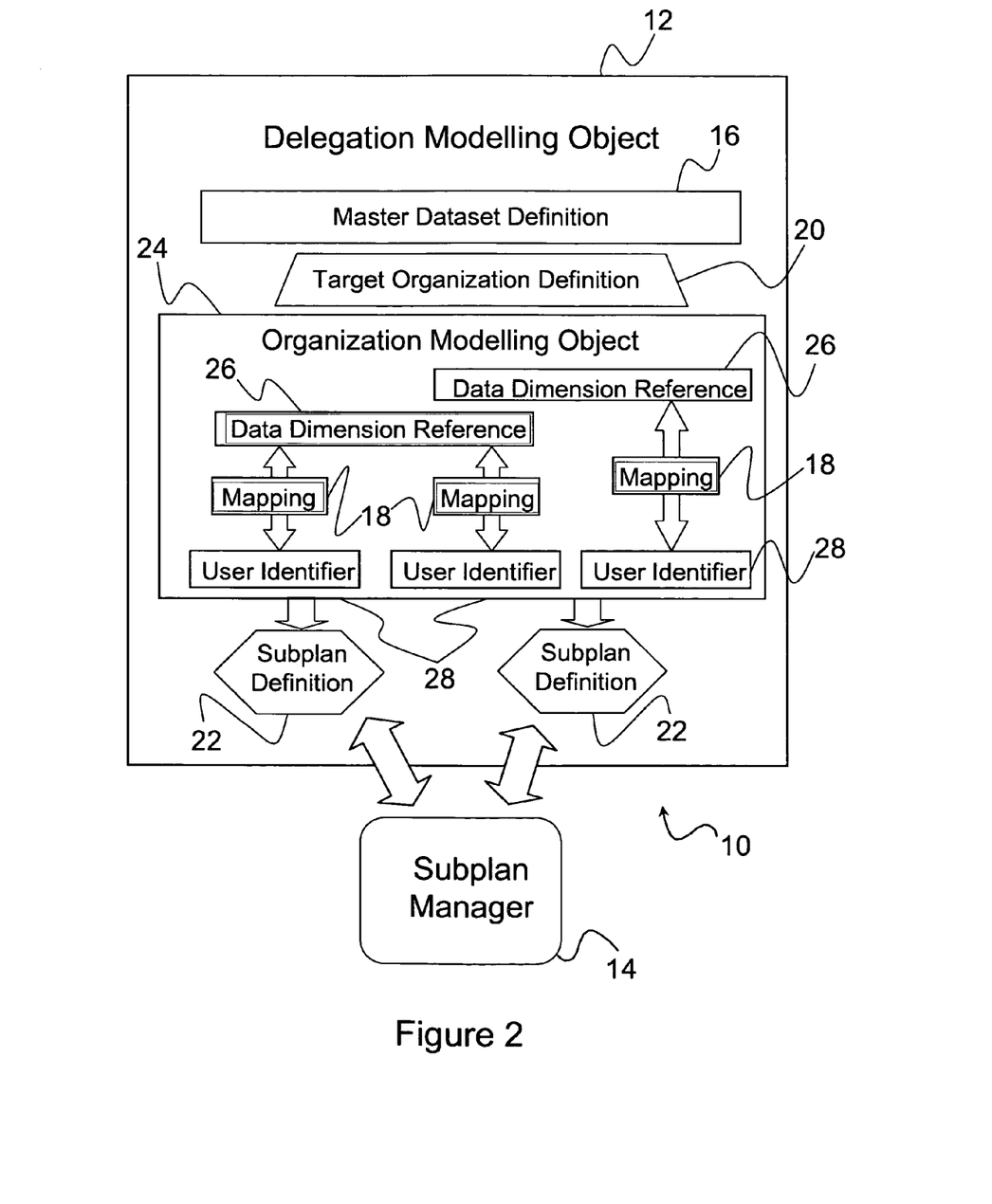
FIG. 2 shows the system including an organization modelling object.

In an embodiment of the present invention, the data dimension-to-user mappings 18 are provided by an organization modelling object 24 having one or more than one data dimension reference 26, one or more than one user identifier 28 defining intended recipients, and a mapping between each data dimension reference and one or more than one user identifier 18, as illustrated in FIG. 2.

Figure 3:
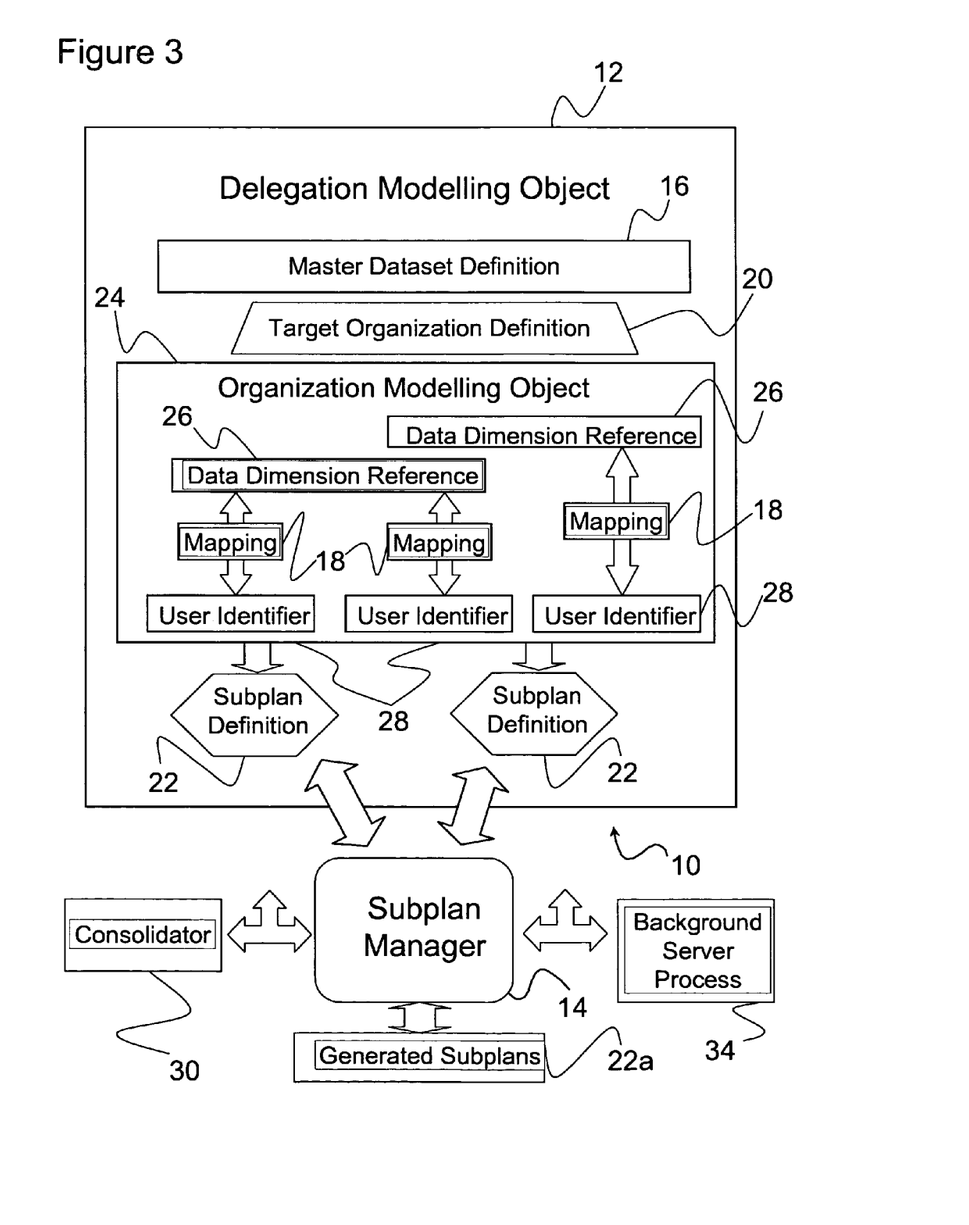
FIG. 3 shows the system including an organization modelling object, consolidator, and background server process.

In an embodiment of the present invention, the system 10 further includes a consolidator 30 for, upon completion of user interaction, extracting data from each delegated subplan 22a not found in its superior subplans 22a and returning that extracted data to its original dataset, as illustrated in FIG. 3.

Figure 4:
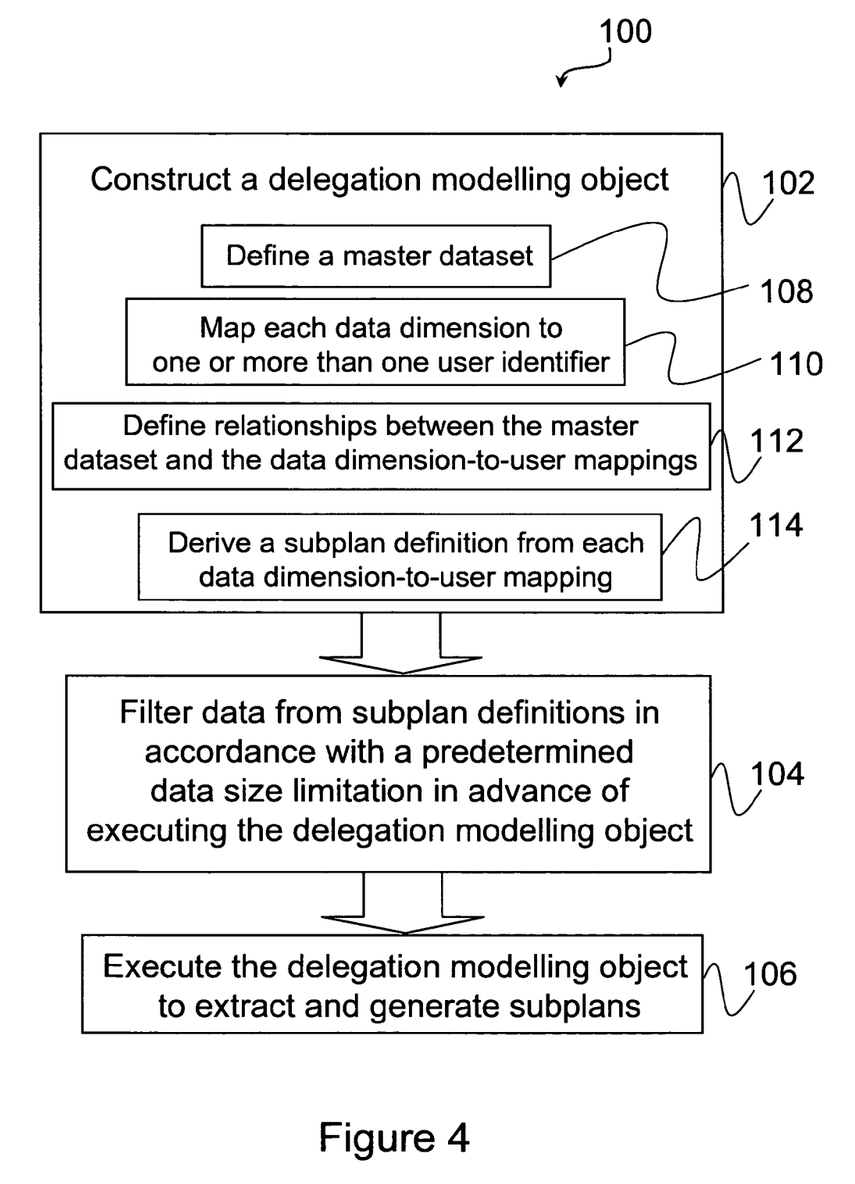
FIG. 4 is an overview of a very large dataset representation method in accordance with an embodiment of the present invention.

As illustrated in FIG. 4, the method 100 includes the steps of constructing a delegation modelling object 102, filtering data from subplan definitions in accordance with a predetermined data size limitation in advance of executing the delegation modelling object 104, and executing the delegation modelling object to extract and generate subplans 106.

The delegation modelling object is constructed by defining a master dataset 108, mapping each data dimension to one or more than one user identifier 110, defining relationships between the master dataset and the data dimension-to-user mappings 112, and deriving a subplan definition from each data dimension-to-user mapping 114.

Figure 5:
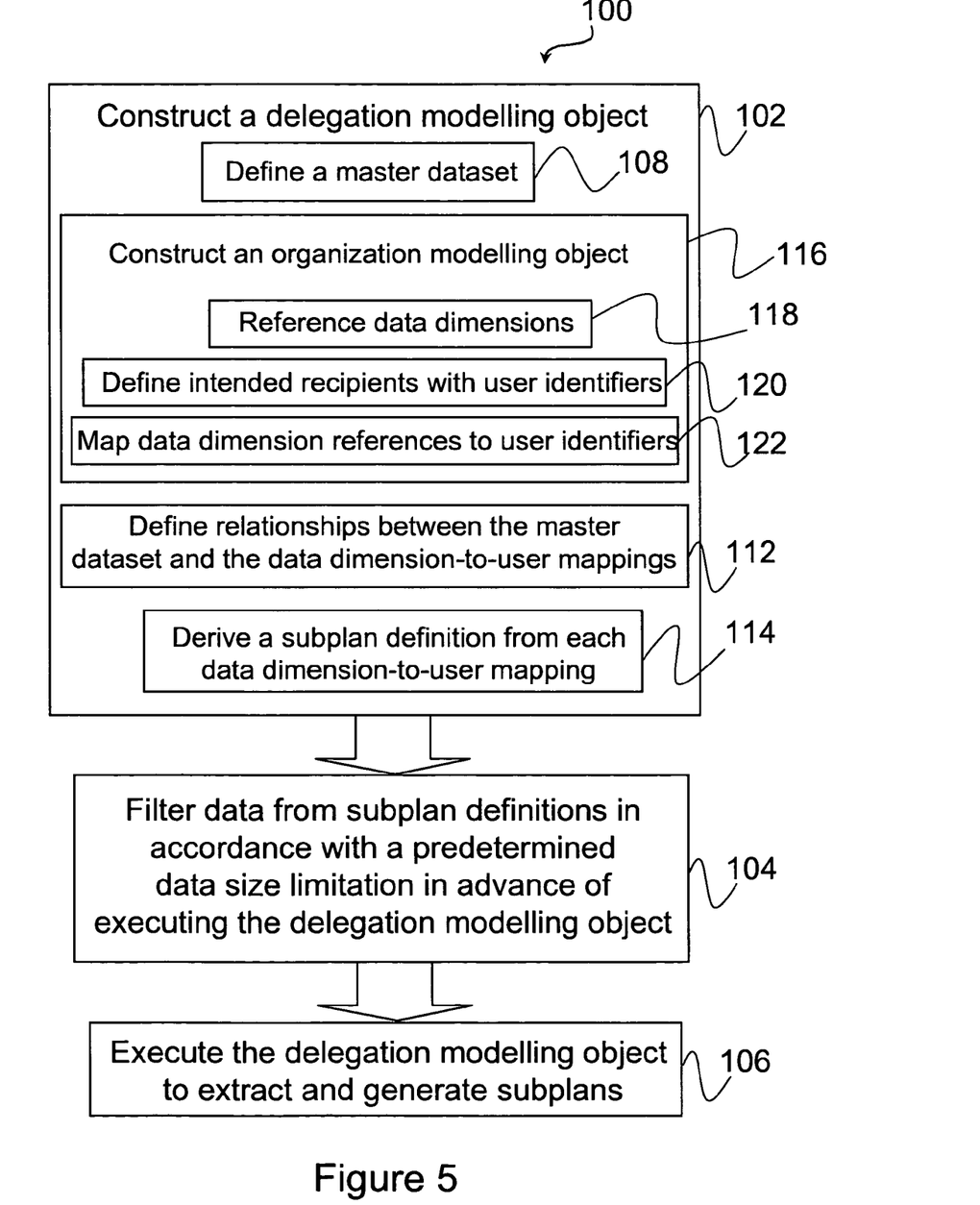
FIG. 5 shows the method including the step of constructing an organization modelling object.

In an embodiment of the present invention, the step of mapping each data dimension to one or more user identifiers 110 is provided by the step of constructing an organization modelling object 116 by referencing one or more than one data dimension 118, defining intended recipients with one or more than one user identifier 120, and mapping each data dimension reference to one or more than one user identifier 122, as illustrated in FIG. 5.

Figure 6:
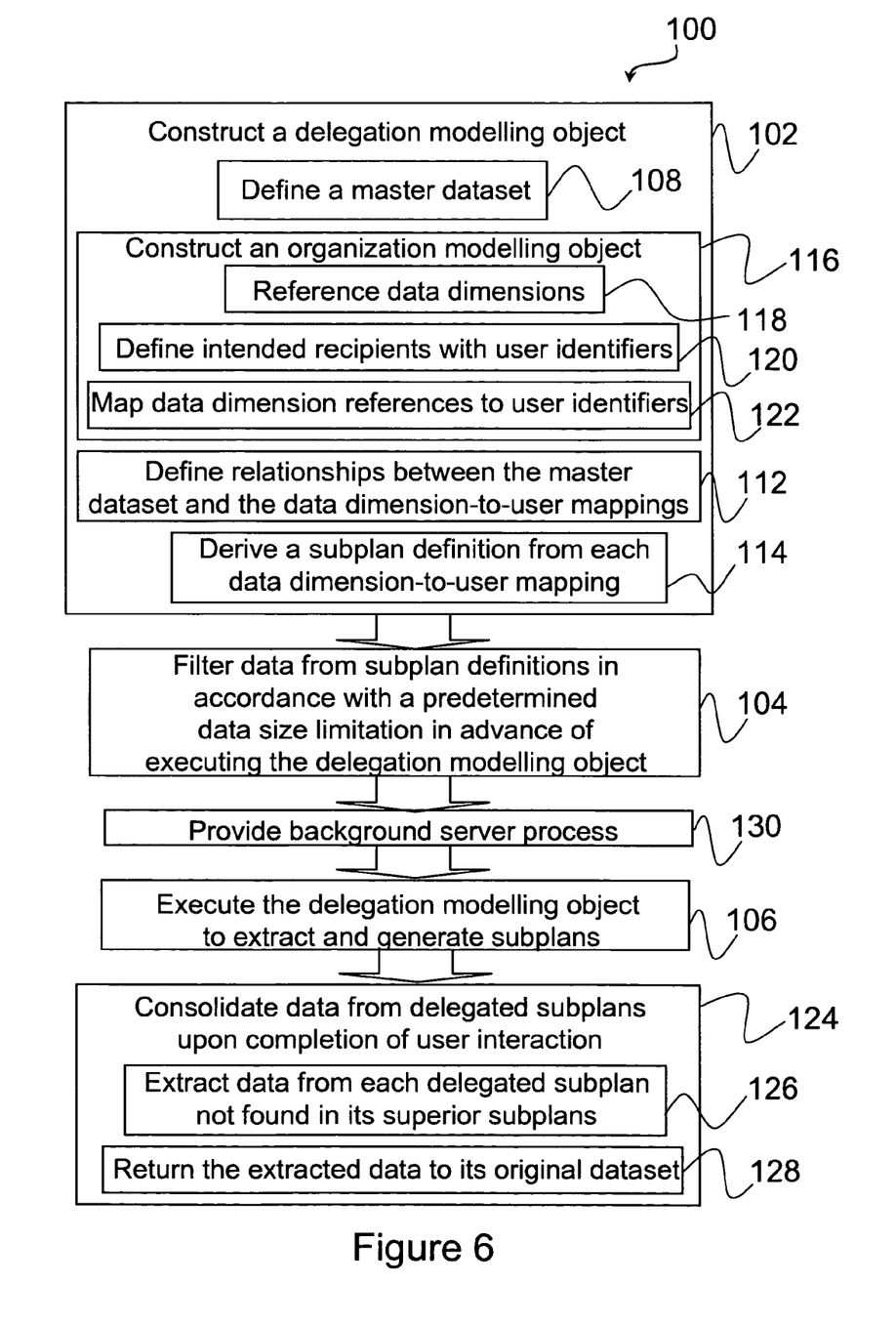
FIG. 6 shows the method including the step of constructing an organization modelling object, providing a background server process, and consolidating data from delegated subplans.

In an embodiment of the present invention, the method 100 further includes the step of consolidating data from the delegated subplans upon completion of user interaction 124 by extracting data from each delegated subplan not found in its superior subplans 126, and returning the extracted data to its original dataset 128, as illustrated in FIG. 6.

However, before further description of detailed embodiments of the present invention is provided and explained, the following glossary of terms is provided in order to aid in understanding the various elements associated with the present invention.

GLOSSARY

A "cube" as defined herein is a data-modelling object created either manually or automatically from data sources by a planning modeller. The term cube is often used in the art to describe, in a tangible manner, a conceptual understanding of multi-dimensional data structures, whereby data values can be perceived as being stored in the cells of a multi-dimensional array.

A "plan" as defined herein is a guide to providing a "snapshot" of a cube and is created by a database modeller and delivered to the manager of a plan. Unlike cubes, plan dimensions are not modifiable by users. By intention, only plan owners or managers can modify plans.

A "subplan" 22a as defined herein is a read-only portion of a plan distributed to user classes based upon a specified organization. Subplans 22a are generated by a delegation process that will be defined below.

A "proposal" 36 as defined herein is a modifiable version of a subplan definition 22 created by a subplan owner to aid in a planning process.

An "organization" 24 as defined herein is a first-class business-modelling object that defines the relationship between dimensional data and user/role identifiers as defined by a business application's security model. An organization modelling object 24 defines the contents of each in a series of subplans and their hierarchical relationship to one another, defines the contents of each subset of data to be extracted, and associates each data subset with a user who will receive and manage that data subset.

Organizations and their embodiment in organization modelling objects 24 are the subject of the Applicant's co-pending United States application for patent titled "Organization Modelling Object as a First-Class Business Modelling Object, and Method and System for Providing Same" filed Feb. 19, 2003, the teachings of which are hereby incorporated by reference in their entirety.

A "delegation" 12 as defined herein is a first-class business-modelling object that associates a dataset with an organization modelling object 24, and manages the workflow and scheduling around the delivery of subsets of data. Delegation modelling objects 12 provide a formal definition of this process by defining a master dataset and associating the organization hierarchy by which specific datasets or subplans 22a will be generated from the master dataset. A delegation modelling object 12 automates the creation and delivery of subplans 22a and keeps track of changes to subplans 22a over time. A delegation modelling object 12 also provides control to shutdown, as well as clean up an entire delegation process.

Delegation modelling objects 12 are described in detail in Applicant's co-pending United States application for patent, titled "Delegation Modelling Object as a First-Class Business Modelling Object, and Method and System for Providing Same" filed Feb. 19, 2003, the teachings of which are hereby incorporated by reference in their entirety.

A "dataset" as defined herein is a set of related source data to be used by a delegation modelling object 12 in data extraction and consolidation processes. A dataset should therefore contain elements of the dimensionality referenced in an organization modelling object 24. Furthermore, a single dataset can be the source of more than one distinct delegation 12.

"Subplan filtering" as defined herein describes a process by which each subplan definition 22 is filtered for distribution down to a maximum data size, while respecting the hierarchy as defined by its organization modelling object 24 in order that each user can work with that data on their individual computer systems.

"Consolidation" as defined herein describes a process for the reintegration of all data subsets 22a back into their original dataset.

Returning now to a detailed description of the present invention, the delegation of a very large dataset is a process by which the extractions of data from a data warehouse are described by an organization 24, and managed by a delegation 12. Very large dataset delegations 12 are reusable definitions that provide data extraction methods based on business organizational rules, workflow management, and subplan filtering while respecting the organizational integrity defined by the organization 24, as well as consolidation back into an original dataset. A delegation modelling object 12 contains a reference to an organization modelling object 24 in order to define how a master dataset is to be broken out and delivered. A delegation 12 provides a relationship between dimensional data and management roles provided by a data dimension-to-user mapping 18 in order to establish areas of responsibility.

As opposed to a very large dataset delegation 12 in accordance with the present invention, in a "regular" delegation as embodied and described in Applicant's aforementioned co-pending United States application for patent titled "Delegation Modelling Object as a First-Class Business Modelling Object, and Method and System for Providing Same" each generated subset of data represents the subplan 22a of a larger data subplan 22a generated at a higher level of a management hierarchy. The hierarchy of those subplans 22a is defined in an organization modelling object 24, and since the top-level plan in a so-called "regular" delegation contains the entire dataset, no consolidation back to the original dataset is required.

Therefore, in a planning area consolidation process for example, each subplan 22a delegated to a user will roll back up the chain of delegated subplans 22a to a "top-level" plan. However, since each higher-level or "superior" subplan 22a will contain all the data from each of its subordinate subplans 22a, higher-level subplans 22a will become increasingly large, with high-level subplans 22a in larger organizations ultimately becoming unmanageable.

The very large dataset representation system 10 enables a plan manager to define, based upon an organization modelling object 24, a delegation modelling object 12 for a very large dataset. This creates a very large dataset delegation 12 of multiple subplans 22a that can then be individually filtered for specific size restrictions. The system 10 enables a plan manager to filter the definition 22 of each subplan prior to the execution of the delegation modelling object 12 precluding any need for higher-level subplans 22a to contain all the data contained in their subordinate subplans 22a. This allows subplans 22a to contain increased levels of detail not included in their superior subplans 22a, detail that will instead only be summarized in higher-level subplans 22a. A subsequent consolidator 30 process will then extract data not found at higher levels from each delegated subplan 22a, and return that data to its original dataset.

Much like the previously defined regular delegation modelling object that binds a dataset to an organization modelling object 24 in order to define a set of related data subsets, the very large dataset representation system 10 associates or "maps" an organization's 24 hierarchal structure to an external source of data such as a data warehouse in order to define a set of related subplans 22a. When a very large dataset delegation 12 is run, data is extracted directly from an external source and delivered to the computer systems of individual users, with each subplan 22a generated on an individual basis having been filtered in accordance with data size limits.

An exemplary example of the use of an embodiment of the very large dataset representation system 10 is illustrated in the following discussion and accompanying figures. In this example, ABC Co. has a budget-related dataset in its data warehouse that it wishes to distribute to each of ABC Co.'s regional managers. This budget dataset contains a master dimension 26 that includes the category dimensions 26 "Account Measures" "Territories" "Vendor Segments" and "Years".

Figures 7, 8:
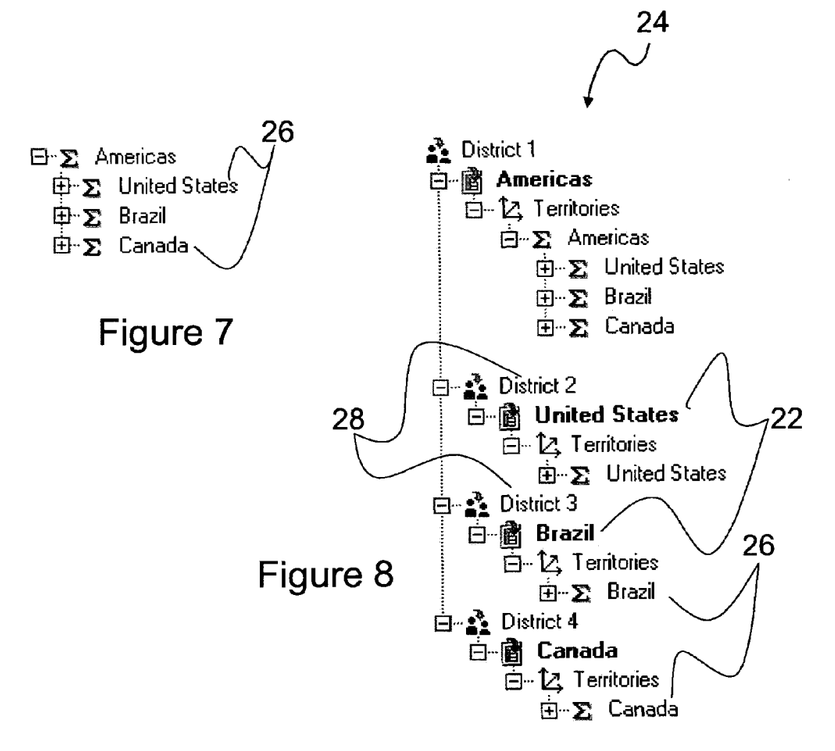
FIG. 7 illustrates region dimensions.
FIG. 8 illustrates an organization modelling object with defined associations.

As illustrated in FIG. 7, in addition to the category dimensions 26 the budget dataset further contains the region dimensions 26, "United States", "Brazil" and "Canada", all subordinated to an "Americas" region dimension 26. The budget dataset also contains a measures dimension 26 as illustrated in TABLE 1.

TABLE 1

| Measures Dimension |
| --- |
| Revenue |
| Net Income |
| Gross Margin |
| Gross Profit |
| Break Even |
| Net Margin |
| Return on Assets |
| Current Ratio |
| Debt/Asset |
| Cost of Goods Sold |
| Operating Cost |
| Total Operating Expenses |

As well, ABC Co. has defined the management roles 28 illustrated in TABLE 2.

TABLE 2

Management Roles

| | |
|---|---|
| District 1 Manager | Responsible for all of the "Americas" regions |
| District 2 Manager | Responsible for the United States" region, and reporting to "District 1" manager |
| District 3 Manager | Responsible for the "Brazil" region, and reporting to "District 1" manager |
| District 4 Manager | Responsible for the "Canada" region, and reporting to "District 1" manager |

Figure 9:
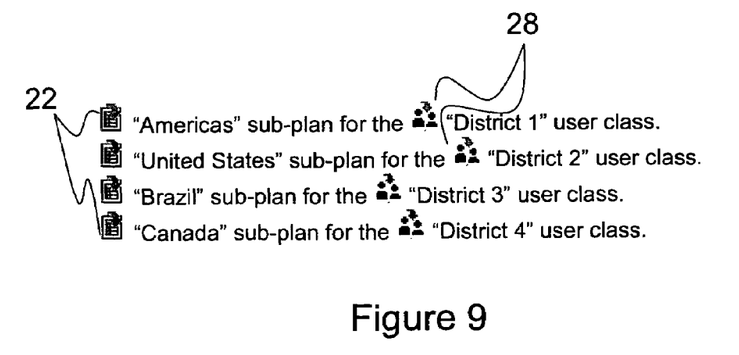
FIG. 9 illustrates subplan definitions for an organization modelling object.

Therefore as illustrated in FIG. 8, a budget manager for ABC Co. would advantageously create a new organization modelling object 24 that would better define these associations. This newly created organization modelling object 24 defines the four subplan definitions 22 illustrated in FIG. 9. If delegated for a large organization, it can be seen by one of skill in the art that the provided organization modelling object 24 would likely define a hierarchy of subplans 22a that would all easily exceed the maximum subplan 22a data size for each user, based on current computing capacity common in most organizations at the user level.

Figure 10:
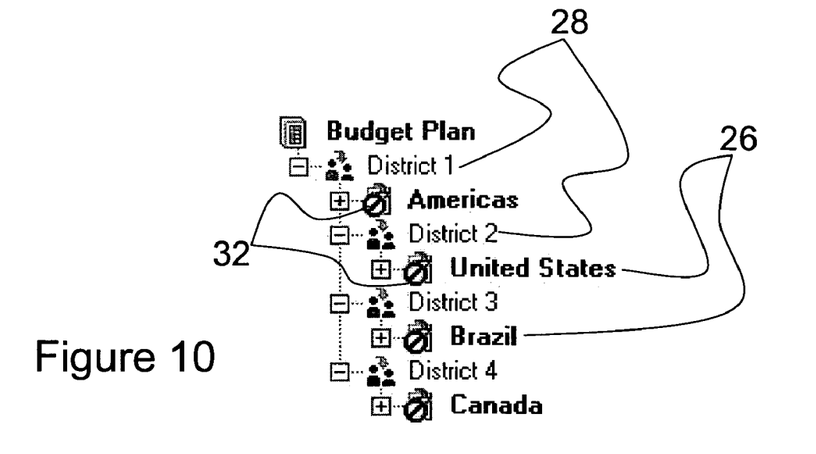
FIG. 10 illustrates a budget plan.

However, the system 10 can be leveraged to distribute and subsequently consolidate the ABC Co. budget. In accordance with an embodiment of the very large dataset representation system 10, the "Budget Plan" illustrated in FIG. 10 has been pre-filtered to contain only a summary of each region. If executed, the subplan definitions 22 shown with "not available" icons 32 would all have exceeded the maximum subplan 22a data size. However, using the subplan manager 14 to filter each subplan definition 22 prior to executing the delegation 12 in accordance with the system 10, a plan manager is able to define a "deliverable" subplan 22a for each user.

Figure 11:
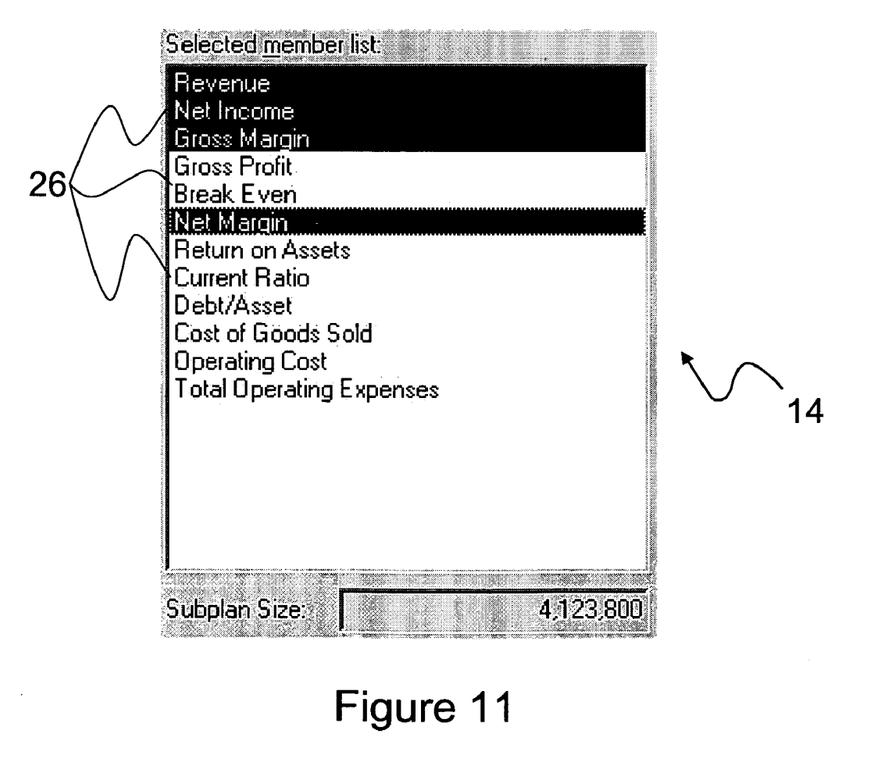
FIG. 11 illustrates the filtering of subplans in a subplan manager.

Thus, the use of a very large dataset in combination with the delegation process has allowed the plan manager to create an organization modelling object 24 based on the region dimension 26, and subsequently assign different region members 26 to each district user class 28, or area of responsibility. The plan manager is then able to create a delegation modelling object 12 for that budget plan, and using the subplan manager 14 edit each subplan definition 22 in that delegation modelling object 12 by selecting only those measures they feel necessary in order to meet the size restrictions of a particular application, as illustrated in FIG. 11. The delegation modelling object 12 is then executed in order to extract and generate deliverable subplans 22a to each designated user.

While the budget plan continues to contain a summary of the regions and all of the measures and each subplan 22a continues to contain all of its specific region members 26, only a subset of the measures data is actually provided to each user. Therefore, all generated subplans 22a in the executed delegation 12 is now less than the pre-determined maximum subplan 22a data size.

A subsequent consolidation process 30 then reintegrates all data subsets 22a directly back into their original source dataset. Each data subset 22a generated by a very large dataset delegation 12 is a part of that delegation's workflow. Modified subplans 22a are returned "up" an organization's management chain, where managers can then accept or reject subordinate subplans 22a returned to them by subordinate users 28. The management workflow process then culminates in the reconstitution of all accepted subplans 22a back into their original dataset. Data from each subplan 22a not found in its respective higher level or "superior" subplan 22a is extracted and consolidated directly back into the original source dataset. In this manner, the manager of a plan can have firm control over which subplans 22a will, and which subplans 22a will not be used for a specific process.

When a very large dataset delegation 12 is run, data is extracted directly from the external data source, and each subplan 22a is subsequently generated directly, and independently of the delegation 12. Subplan definitions 22 can also be updated whenever a data warehouse reporting system is likewise updated. If so desired, the system 10 can be independent of a delegation process 12, enabling a plan manager to initiate an update of a data warehouse reporting system at any point along the process.

In an embodiment of the present invention, the system 10 can further include a background server process 34 for improved performance when generating a large number of datasource-based subplans 22a from a plan delegation process 12, as illustrated in FIG. 3. In an embodiment of the present invention, the method 100 can further include the step of providing a background server process 130 for improved performance when generating a large number of datasource-based subplans from a plan delegation process, as illustrated in FIG. 6.

The system 10 initiates a process by which very large sets of data, typically those datasets greater than about five million cells, external to a data warehouse solution can be imported into that process as a much more manageable set of related planning data subsets 22a.

In addition, the system 10 provides the ability to delegate directly from data sources, and to directly create data source plans, thereby providing a manageable solution for queries that generate very large datasets, datasets that have heretofore proved difficult to manage. The system 10 further enables a plan manager to update and maintain a data warehouse application in a consistent manner.

By providing a highly scalable system of subplans 22a, each within the computational limits of existing computer systems, but whose combined structure is capable of representing a planning problem of virtually any size, the system 10 enables the smooth extraction, management, and consolidation of very large datasets.

Any hardware, software or a combination of hardware and software having the above-described functions may implement the very large dataset representation system 10 and method 100 according to the present invention, and methods described above. The software code, either in its entirety or a part thereof, may be in the form of a computer program product such as a computer-readable memory having the model and/or method stored therein.

Furthermore, a computer data signal representation of that software code may be embedded in a carrier wave for transmission via communications network infrastructure. Such a computer program product and a computer data signal are also within the scope of the present invention, as well as the hardware, software and combination thereof.

Therefore, although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A dataset representation system for delivering subplans representing very large dataset, the system comprising:
    means for running a delegation process defined by a delegation modelling object, the elegation modelling object including:
        a definition of a master dataset;
        a subplan definition for generating subplans from the master dataset, based on an organization hierarchy; and
        an organization modelling object defining contents of the subplans, and the organization hierarchy; and associating the subplan with a data dimension-to-user mapping;
    a subplan manager for filtering the subplan definition in accordance with a predetermined data size limitation, based on the organization hierarchy defined in the organization modelling object;
    means for executing the delegation modelling object with the filtered subplan definition;
    means for extracting and generating a deliverable subplan; and
    means for delivering the deliverable subplan to a designated user.

2. The dataset representation system according to claim 1, wherein subplans in a lower level of the hierarchy have increased level of detail not included in subplans in a superior level.

3. The dataset representation system according to claim 2, further including a consolidator for extracting data from each delegated subplan not found in the subplans in the superior level and consolidating the extracted data to an original source dataset.

4. The dataset representation system according to claim 1, wherein the organizational hierarchy defined by the organization modelling object includes
    a data dimension reference;
    a user identifier defining intended recipients; and
    a mapping between the data dimension reference and the user identifier.

5. The dataset representation system according to claim 1, wherein the delegation modelling object controls the shutdown of a delegation process.

6. The dataset representation system according to claim 1, wherein one or more of the subplan definitions is a proposal to aid in a planning process.

7. A method of delivering subplans representing very large datasets, the method comprising the steps of:
    providing a master dataset;
    generating subplans from the master dataset, based on an organization hierarchy, the organization hierarchy defined by an organization modelling object;
    extracting contents for the subplan from the master dataset based on the organization modelling object;
    associating the subplans with a data dimension-to-user mapping;
    filtering data from the subplans in accordance with a predetermined data size limitation;
    executing the delegation modelling object with a filtered subplan definition;
    extracting and generating a deliverable subplan; and
    delivering the deliverable subplan to a designated user.

8. The method according to claim 7, wherein subplans in a lower level of the hierarchy have increased level of detail not included in subplans in a superior level.

9. The method according to claim 8, further comprising the step of constructing an organization modelling object.

10. The method according to claim 9, wherein the step of constructing an organization modelling object further comprises the steps of:
    referencing a data dimension;
    defining intended recipients with an user identifier; and
    mapping the referenced data dimension to the user identifier.

11. The method according claim 8, further including the step of consolidating data from the delegated subplans.

12. The method according to claim 11, wherein the consolidation step includes the steps of:
    extracting data from each delegated subplan not found in the subplans in the superior level; and
    returning the extracted data to an original source dataset.

13. A storage memory readable by a computer encoding a computer program for delivering subplans representing a very large dataset, the computer program comprising the steps of instructions for:
    providing a master dataset;
    generating subplans from the master dataset, based on an organization hierarchy, the organization hierarchy defined by an organization modelling object;
    extracting contents for the subplans from the master dataset based on the organization modelling object;
    associating the subplans with a data dimension-to-user mapping;
    filtering data from the subplans in accordance with a predetermined data size limitation;
    executing the delegation modelling object with a filtered subplan definition;
    extracting and generating a deliverable subplan; and
    delivering the deliverable subplan to a designated user.

* * * * *